Nov. 4, 1924.   
L. McCORMICK  
1,514,552  
APPARATUS FOR SIMULATING NATURAL PHENOMENA  
Filed July 10, 1922   2 Sheets-Sheet 1

Inventor  
Langdon McCormick  
By  
Attorney

Nov. 4, 1924.                                                            1,514,552
                              L. McCORMICK
                   APPARATUS FOR SIMULATING NATURAL PHENOMENA
                        Filed July 10, 1922        2 Sheets-Sheet 2
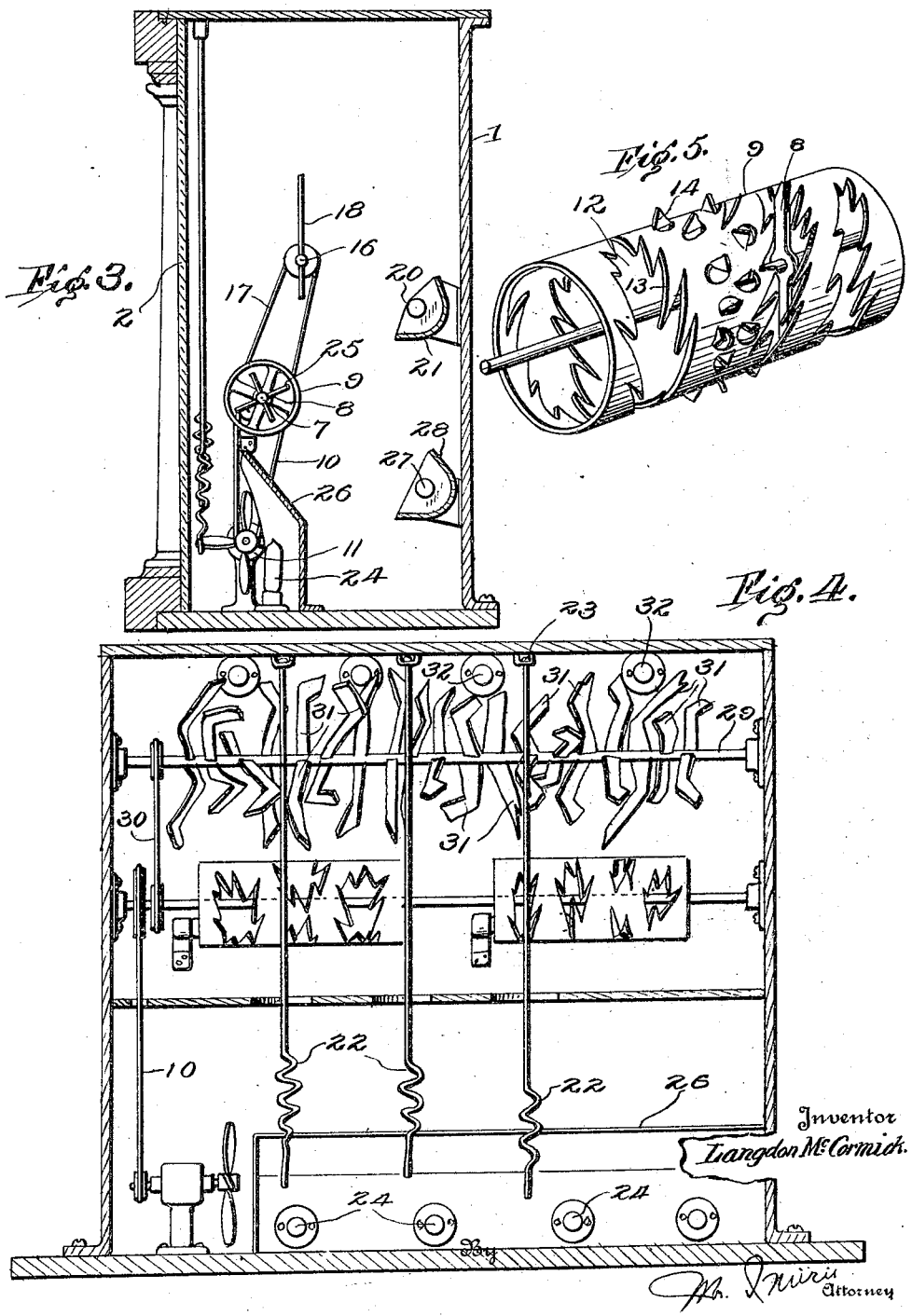

Patented Nov. 4, 1924.

1,514,552

UNITED STATES PATENT OFFICE.

LANGDON McCORMICK, OF NEW YORK, N. Y.

APPARATUS FOR SIMULATING NATURAL PHENOMENA.

Application filed July 10, 1922. Serial No. 573,840.

*To all whom it may concern:*

Be it known that I, LANGDON McCORMICK, a citizen of the United States of America, residing at New York, in the county of New York and State of New York, have invented certain new and useful Improvements in Apparatus for Simulating Natural Phenomena, of which the following is a specification.

This invention is directed to an improvement in apparatus for producing illusionary effects in simulation of natural phenomena.

The invention in the specific instance illustrated and described, contemplates the simulation of a forest fire, wherein the illusionary effect is produced of rising and falling flames, rising smoke columns, sparks from the seat of the fire, and an intermittent and variable glare on the clouds as from the flame of the fire. The apparatus for producing this effect is combined of course, with a more or less translucent screen, on which is permanently indicated the fixed scenic details, as for example, the forest trees, the clouds, and perhaps a stream of water, the apparatus details also including a means for simulating the rippling or flowing of such stream of water where such may form a part of the general scenic effect.

The apparatus is devised with a view to providing an extremely simple structure, which will so control, govern, or reflect particular sources of artificial illumination as to simulate to the observer in front of the screen the natural phenomena intended to be produced.

The invention in its general details comprises one or more flame and spark simulating elements in the form of cylinders adapted to be rotated and formed with irregular openings, through which the light from an interior red globe intermittently energized, is adapted to be projected to simulate the flame of a fire, certain small openings in the cylinder with the material cut from the cylinder to form said openings bent outwardly from the surface of the cylinder, serving to produce the spark effect. A plate of irregular edge contour is also adapted for rotation to produce through its shadow effect on the screen the simulation of smoke spirals. If a stream of water is included in the fixed scenic details, such stream is illuminated by an appropriately colored light from the rear and sinuous elements suspended for free movement under a more or less constant force, as a stream of air, impart to the stream outlined on the scene a simulated rippling or flowing.

The apparatus also contemplates, for an additional effect where desired, the use of a series of bright metal strips projecting from a shaft mounted for rotation, for the reflection from a suitably arranged intermittent source of colored light, to simulate the variable, increasing and decreasing, glare as from the source of fire.

The invention is illustrated in the accompanying drawings, in which:

Fig. 3 is a transverse section through the screen and apparatus.

Fig. 4 is a perspective view of one of the cylinders used for simulating the fire and spark effect.

Fig. 5 is a view of the structure with the screen removed, showing the glare simulating elements.

Figure 1:
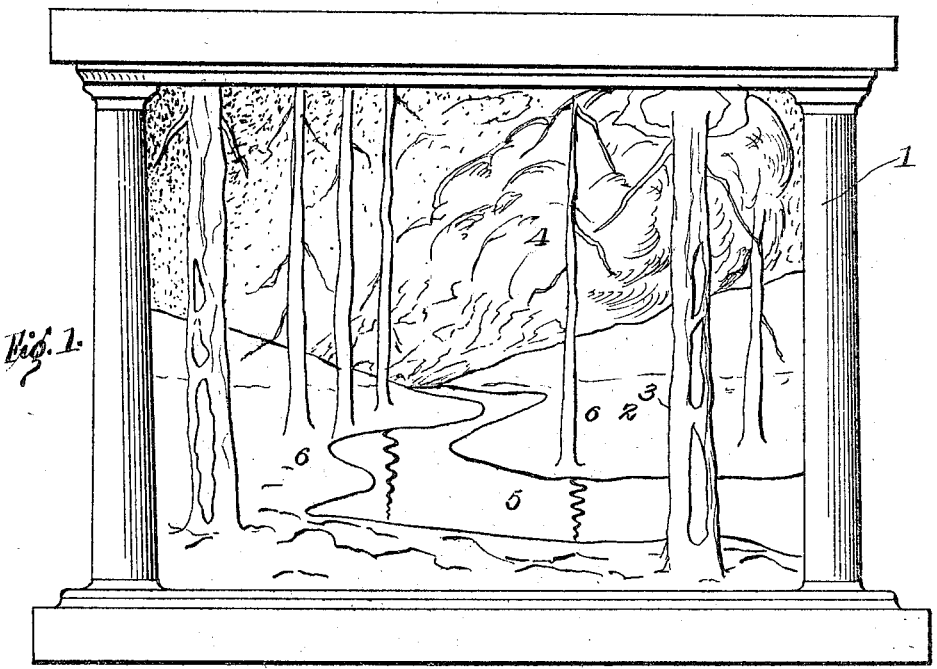
Fig. 1 is a front view showing the screen and fixed scenic details.
Figure 2:
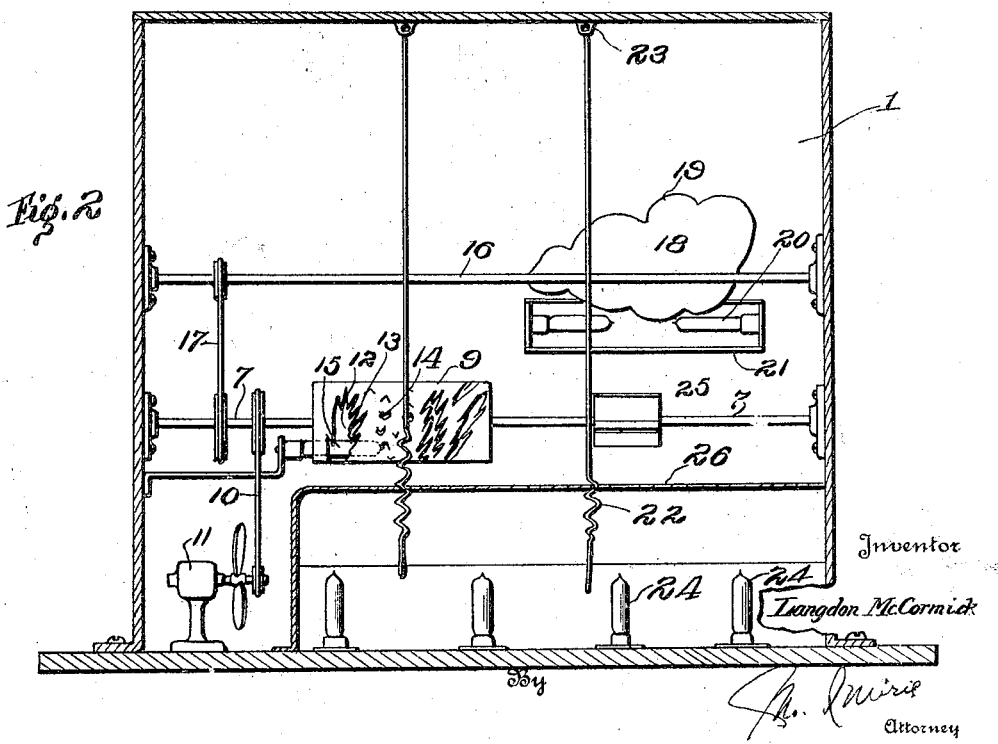
Fig. 2 is a similar view with the screen removed and showing the apparatus for simulating the natural phenomena.

The invention as here shown is designed to simulate a forest fire, and the adaptation of the apparatus is for that of a portable structure designed for display purposes in theater lobbies, show windows, and the like.

In the specific adaptation shown, the invention comprises a casing 1, the front of which is formed by a screen 2, which for the most part is rather densely translucent, while in other parts the translucence is not so dense. On the dense portion 2ª of the screen is depicted the fixed scenic objects, as for example, hills, stones and trees 3, while on the less dense portions 2ᵇ of the screen are depicted clouds 4, a stream of water 5, and the usual movable shrubbery surface 6. In rear of the screen, there is mounted in the side walls of the casing, a shaft 7, on which is fixed as by spiders 8, one or more open ended cylinders 9. The shaft 7 is driven by a belt 10 from a motor 11, the motor connection being made with any convenient socket. The cylinders 9, of which one or more may be used, have their walls cut out to form openings 12, the edges of which are extremely irregular as indicated at 13. Portions of the cylinder wall are also cut and the material turned outwardly to provide irregular projections 14. The surfaces of these projections are preferably highly polished. A red globe 15 extends within each cylinder 9, the source of current to this globe being intermittent, to alternately flash and darken the globe. The cylinders 9 are preferably located on a line with a particular portion of the ground surface 6 on the screen, so that the effect gained from these cylinders, as will be later described, is apparently produced near the surface of the ground.

A second shaft 16 is mounted above and slightly in rear of the shaft 7, being driven at a reduced speed from the latter by a belt 17. On the shaft 16 are secured comparatively thin plates 18 having irregular edges outlines 19, and arranged on the rear wall of the case 1, are one or more red globes 20, with or without reflectors 21, intermittently energized to direct their illumination onto the rear surface of the plate 18.

If, as preferred, the scenic details include a stream of water as 5, provision is made for simulating the rippling or flowing of the stream through the use of a suitable number of sinuous elements 22 freely pendent from the top of the case as at 23, and arranged in rear of the stream outline. A series of continuous lights 24, preferably blue in color, are directed onto the stream outline, and the shaft 7 is provided with a fan 25 for generating a current of air to cause movement of the elements 22. The blue lights 24 may be provided with a shield 26 to prevent such lights illuminating the screen beyond the stream outline.

If it is desired to present the appearance of a general glare, there is provided a series of lights 27 on the rear of a casing, preferably red globes and intermittently energized, with or without reflectors 28. If a flame reflection is desired upon the clouds 4, for example, a shaft 29 may be mounted in the upper portion of the casing and driven from the shaft 7 by belt 30. On this shaft 29 are secured a number of metallic strips 31 of irregular shapes and sizes, all of which strips are highly polished or of extremely bright metal. A series of intermittently energized red lights as 32 may be concealed in the top of the casing, to intermittently light the bright strips 31 and thereby reflect a flame appearance on the clouds 4.

It will be apparent that the intermittent flashes of the source of red light 15 will cause irregular light rays of red color to be projected through the openings 12, which by the rotation of cylinders 9, closely simulates the rise and fall of flames, such as from a fire. At the same time, the light rays reflected from the projections 14 of the cylinder, which projections may be bent at an appropriate angle for such reflection, give the appearance of bright flame dots, thus simulating sparks. The plate 18 in its rotation alternately throws a shadow onto the screen and eliminates such shadow effect as the plate is turned edgewise to the screen. This gives the effect of successive smoke spirals to simulate smoke rising from the fire. The sinuous members 22 simulate the rippling or flowing water, while, if the flame reflectors 31 be not used, lights 20 serve to produce a glare effect on the clouds. This glare effect may be intensified by the strips 31, reflecting the light from the sources of illumination 32.

Thus, the natural effects of a forest fire are readily and realistically simulated through a simple type of apparatus, it being particularly understood that while the structure here shown and described is designed for portable display purposes, it is obvious that the apparatus is readily applicable for larger effects, as for simulating a fire scene on the stage or in like places. In such larger use, the screen with the fixed scenic details will of course be a separate structure, and the various parts of the apparatus described will be mounted for coordinate operation in any usual or preferred manner.

No limitation is herein intended by the particular representation of fixed scenic details, it being understood that the apparatus described or any particular detail thereof is adapted for uses with all types of scenic details, wherein realistic simulation of natural phenomena is contemplated.

It is to be further understood that the color of the globes and the location of the globes may be changed to suit the particular picture represented on the screen.

Claims:

1. An apparatus for simulating natural phenomena, including a cylinder formed with openings, spark-simulating projections on the surface of the cylinder, means for rotating the cylinder, and a source of light within the cylinder.

2. An apparatus for simulating a fire scene, including a cylinder formed with openings of irregular outline, reflecting projections on the surface of the cylinder to simulate sparks in the rotation of the cylinder, means for rotating the cylinder, and a source of red light within the cylinder.

3. An apparatus for simulating a fire scene, including a cylinder formed with openings of irregular outline, reflecting projections on the surface of the cylinder to simulate sparks in the rotation of the cylinder, means for rotating the cylinder, and a source of intermittent red light within the cylinder.

4. An apparatus for simulating a fire scene, including a translucent screen having fixed scenic details, a cylinder mounted for rotation in rear of the screen, said cylinder being formed with openings of irregular outline and having reflecting surface projections, a source of light arranged in the cylinder and serving through rotation of the cylinder to simulate flame and sparks on the screen, and a plate mounted for rotation to produce intermittent shadow on the screen to simulate smoke.

5. An apparatus for simulating a fire scene, including a translucent screen having fixed scenic details, a cylinder mounted for rotation in rear of the screen, said cylinder being formed with openings of irregular outline and having reflecting surface projections, a source of light arranged in the cylinder and serving through rotation of the cylinder to simulate flame and sparks on the screen, and a plate of irregular edge outline mounted for rotation to produce intermittent shadow on the screen to simulate smoke.

6. An apparatus for simulating a fire scene, including a translucent screen having fixed scenic details, a cylinder mounted for rotation in rear of the screen, a source of red light within the cylinder, said cylinder being formed to control the rays of light from said source of light to simulate flame and spark, a plate operative in rear of the screen to produce intermittent shadow effect on the screen to simulate smoke, and means to operate the cylinder and plate.

7. An apparatus for simulating a fire scene, including a translucent screen having fixed scenic details, a cylinder mounted for rotation in rear of the screen, a source of red light within the cylinder, said cylinder being formed to control the rays of light from said source of light to simulate flame and spark, a plate operative in rear of the screen to produce intermittent shadow effect on the screen to simulate smoke, and a series of irregular flame reflecting strips mounted for movement on a common axis.

8. An apparatus for simulating a natural phenomena, including a translucent screen having fixed scenic details including a stream of water, a source of light to illuminate the outline of the stream of water, a series of sinuous elements pendent in rear of the screen within the outline of the stream of water, and means for causing irregular movement of said element to simulate a rippling or flowing movement of the stream of water.

In testimony whereof I affix my signature.

LANGDON McCORMICK. [L. s.]